Jan. 13, 1959

L. L. DAVISON 2,867,875

CABLE CLAMP

Filed April 19, 1954

*INVENTOR.*
Lawrence L. Davison

BY *ATTORNEY*

United States Patent Office 2,867,875
Patented Jan. 13, 1959

2,867,875

CABLE CLAMP

Lawrence L. Davison, Houston, Tex.

Application April 19, 1954, Serial No. 423,895

6 Claims. (Cl. 24—133)

This invention relates to new and useful improvements in a line fastener.

It is an object of the invention to provide a line fastener for use on such items as volley ball nets, and the like, to secure same to the net posts in a novel manner.

It is another object of the invention to provide a line fastener with novel means for gripping and securing a line and novel means for releasing the same.

It is another object of the invention to provide a line fastener for volley ball nets, and the like, that may be quickly and easily employed, and that may be readily adjusted to accommodate lines of various diameters.

With the above and other objects on view, the invention has relation to certain novel features of construction and operation of parts more particularly defined in the following specification and illustrated in the accompanying drawings, wherein.

Figure 3:
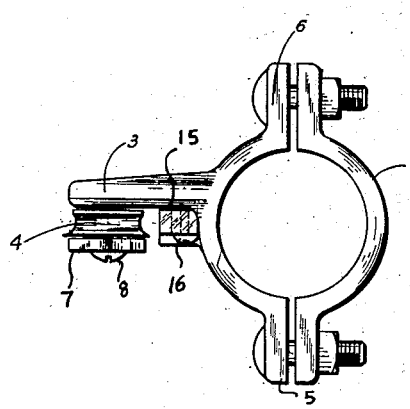
Figure 3 is a plan view of the fastener.

Referring now more particularly to the drawings, the numeral 1 designates a pipe clamp member shaped to accommodate a post or upright, which member is secured to the cooperating clamp member 2. Extending outwardly from the clamp member 2 is a projecting wall 3 which is projected off center as shown in Fig. 3 in order that the pulley 4, which is rotatably mounted thereon, will have its periphery centered on the clamp member 2 with relation to the bolt receiving flanges 5, 6.

The pulley 4 has its outer edge extended forming a line retaining flange. A pivotally mounted lever 7 has one end loosely mounted on the stud 8 which supports the pulley 4. Beneath the pulley 4 is loosely mounted the eccentric gripping pawl 9 which has its elongated face equipped with teeth or serrations. The stud 10 on which the pawl 9 is mounted, extends through an arcuate horizontal slot 11 in the lever 7 and is secured in the member 3. A stud 12 extends inwardly from the inside face of the lever 7 and is positioned to bear against the pawl 9. A similar stud 13 extends inwardly from the inside face of the lever 7 adjacent the lower end thereof.

An upwardly and outwardly extended shoulder 14 is formed at the juncture of the members 2 and 3. A movable jaw 15 is mounted on the member 3 by means of the stud 16 which is extended through the slot 17 in the jaw 15 and is fixedly mounted in the member 3.

Figure 4:
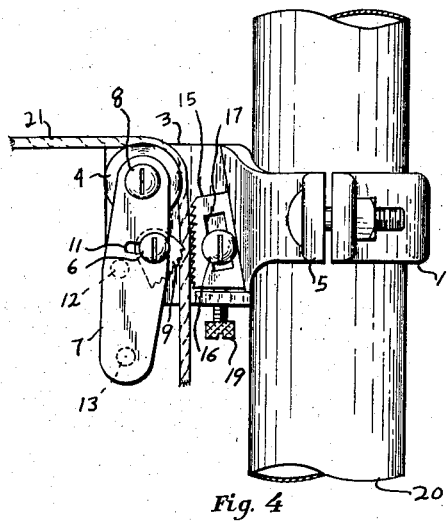
Figure 4 is a side elevational view of a line in gripped relation.
Figure 1:
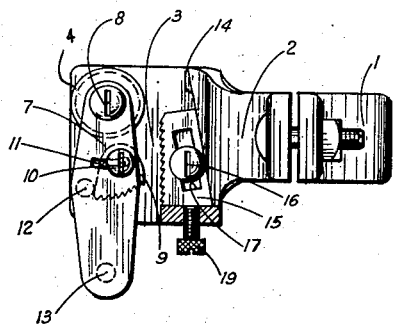
Figure 1 is a side elevational view of the line fastener.
Figure 2:
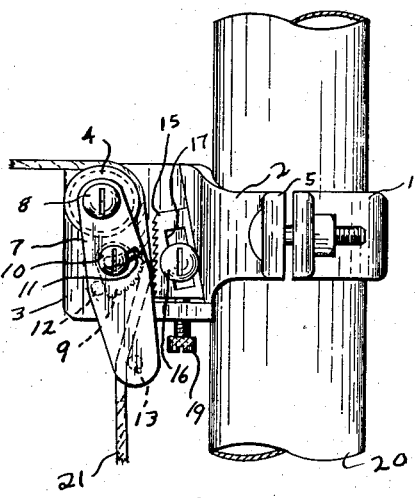
Figure 2 is a side elevational view, illustrating a line being moved into gripping relation.

In operation, the clamp members 1, 2 are secured to an upright post, such as is used in mounting a volley ball net, at the desired height, usually eight feet above the ground surface. A line may be passed over the flanged pulley 4 and between the teeth of the pawl 9 and jaw 15 and to the left of the stud 13 as shown in Fig. 2. A downward pull on the line 21 will cause the lever 7 to be rocked in a counter clockwise direction as shown in Fig. 2. This brings the stud 12 into contact with the left edge of the toothed pawl 9 and brings that pawl into contact with the line 21 and presses the line against the toothed jaw 15. Tension on the line above the clamp keeps the toothed members in engagement with the line. To release the line from the clamp, the loose lower end of the line shown in Fig. 4 must be brought against the right edge of the stud 13 and pulled so that the lever 7 will be rotated in a clockwise direction to cause the stud 10 and pawl 9 to be moved by the right end of the slot 11 away from a line engaging position after which the pull on the lower end of the line 21 may be removed. Alternately, the loose end of the line 21 can be pulled downwardly without engaging the stud 13. This will cause the toothed pawl to release its grip on the line. By holding the line close to the post 20, it can be slipped between the toothed pawl and the toothed jaw, however, it may reengage the paw unless constant care is exercised.

Increased pressure on that portion of the line above the clamp will merely increase the pressure of the pawl and jaw against the line. When the line is clamped between the pawl and jaw, the free end of the line is disengaged from the stud 13 so that it hangs free. To reengage the clamp, the free end of the line is again passed around the stud 13, so that downward pressure on the line will rock the lever 7.

The pawl 9 is an eccentric, and preferably shaped to provide a slightly curved toothed area. The jaw 15 is provided with an outer inclined toothed portion, and has an inner inclined side wall which abuts the similarly inclined shoulder 14, the incline of the shoulder 14 being determined by the curve of the toothed portion of the pawl, so that as the pawl moves into clamping relation with the jaw 15, the jaw 15 will move upwardly, maintaining a straight horizontal pressure on the line, and as the force on the horizontal portion of the line increases, the number of teeth of the pawl and jaw in engagement with the line also increases.

It is not intended that the teeth of the pawl and jaw should be sharp, but rather the teeth merely being sufficiently edged to secure a firm grip on the line, and not enough to cut or break the material of the line. It is contemplated that this clamp may be applied to cord or fabric, as is used on such items as volley ball net lines, and also to all types of cord or rope and to cable for any purpose where it is desired to secure a line.

The set screw 19 is adjustable to place the jaw 15 just close enough to the pawl 9 to permit easy passage of the line to be clamped therebetween. As is obvious this screw may be adjusted for any diameter of line. Further, where a permanent clamp is desired, the line may be clamped as above set out, and then the set screw 19 tightened with a screw driver to lock the pawl and jaw in clamping relation. When the jaw 15 is blocked against downward movement, there is no way to release the clamping action except by backing off the set screw.

The post illustrated in the drawings is such as a tubular metal upright 20, but may be of any material, and the line shown is a fabric or rope 21, but, of course, may be of any size or material.

While the foregoing is considered a preferred form of the invention, it is shown and described by way of illustration only, the broad principle of the invention being defined by the appended claims.

What I claim is:

1. In a cable clamp, a line receiving pulley, a rotatable lever beneath said pulley, an inwardly projecting pawl stud on said lever, a rotatable toothed pawl and a toothed jaw between which said line is adapted to extend, means on the lower end of said lever adapted to be engaged by the line to move the lever causing the pawl stud to contact the pawl and move the pawl towards the toothed jaw.

2. In a cable clamp, anchoring means having a vertical wall, a cable receiving pulley rotatably mounted on said wall and a downwardly extending lever pivotally mounted on said wall to pivot in a clockwise and counter clockwise direction with its fulcrum point at the axis of said pulley, a vertically reciprocable jaw mounted on said wall, a pivotable jaw adapted to be moved toward and away from said vertically reciprocable jaw, a stud on said lever movable into contact with said pivotable jaw and a stud on the lower end of said lever over which a cable may be passed to pivot said lever toward the vertically adjustable jaw a counter-clockwise direction to move said first mentioned stud into contact with the adjacent side of said pivotable jaw and rock said pivotable jaw into clamping relation with said cable and vertically reciprocable jaw.

3. In a cable clamp, anchoring means having a lateral wall, a pulley rotatably mounted on said wall and a cable extending over said pulley, a pivotally mounted lever extending beneath said pulley, a vertically reciprocable jaw on said wall, a pivotable jaw adapted to be moved toward and away from said vertically reciprocable jaw beneath said pulley and a projection on said lever extending in a position to contact one edge of the pivotable jaw and pivot the same into clamping relation with said cable and vertically reciprocable jaw.

4. In a cable clamp, anchoring means having a lateral wall, a cable receiving pulley rotatably mounted on said wall, a pivotally mounted lever extending beneath said pulley, a vertically reciprocable jaw, a pivotable jaw adapted to be moved toward and away from said vertically reciprocable jaw beneath said pulley a projection on said lever extending in a position to contact one edge of the pivotable jaw and rotate same into clamping relation with said vertically reciprocable jaw and an inwardly projecting stud on the lower end of said lever against which the cable to be clamped may be moved to move said lever and pivotable jaw into and out of line clamping relation.

5. In a line clamp, anchoring means having a lateral extension, a line receiving pulley on said extension and a line mounted on said pulley, a vertically reciprocable toothed jaw and a pivotable toothed jaw adapted to be moved toward and away from said vertically reciprocable jaw mounted on said extension and having the teeth of said jaws facing each other and movable into clamping relation with a line, a pivotable lever mounted on said extension and having a pair of inwardly extending studs, one of said studs being located so as to be in position to be contacted by said line for imparting movement to said lever and the other of said studs being in position to contact said pivotable jaw and move same into and out of clamping relation.

6. In a line clamp, anchoring means having a lateral wall, a rotatable pulley mounted on said wall and a line mounted on said pulley and a depending lever loosely mounted on an extension of the axis of said pulley and movable in a clockwise and counter clockwise direction, a vertically reciprocable toothed jaw on said wall, said lever having a horizontal slot therein through which a stud is extended and mounted in said wall, a toothed pivotable jaw adapted to be moved toward and away from said reciprocable jaw loosely mounted on said stud, inwardly projecting upper and lower members on said lever, the lower member being positioned to have a line positioned on one side thereof and to move said lever toward the reciprocable jaw upon a pull on said line and the upper projecting member being positioned to contact one side of said pivotable jaw and move same into clamping relation with said reciprocable jaw, clamping the line between the jaws, said clamping action being releasable by disengaging said line from said lower projecting member and exerting a downward pull on said line and moving said lever in a reverse direction by bearing against said lower projecting member on the other side thereof causing the end of said slot in said lever to contact said stud and move said pivotable jaw away from said reciprocable jaw.

References Cited in the file of this patent
UNITED STATES PATENTS

| | | |
|---|---|---|
| 481,231 | Johnson | Aug. 23, 1892 |
| 746,086 | Hoyt | Dec. 8, 1903 |
| 746,135 | Obiols | Dec. 8, 1903 |
| 1,941,383 | Benson | Dec. 26, 1933 |
| 2,010,286 | Wiener | Aug. 6, 1935 |
| 2,115,796 | Bradfield | May 3, 1938 |
| 2,435,447 | Kortum | Feb. 3, 1948 |
| 2,450,815 | Schultz | Oct. 5, 1948 |
| 2,494,085 | Chandler | Jan. 10, 1950 |

FOREIGN PATENTS

| | | |
|---|---|---|
| 22,187 | Norway | May 6, 1912 |